(12) United States Patent
Faetanini et al.

(10) Patent No.: US 6,774,622 B2
(45) Date of Patent: Aug. 10, 2004

(54) VEHICLE WHEEL BEARING, WHEEL-SPEED SENSOR MECHANISM ASSEMBLY, AND WHEEL SPEED SENSOR

(75) Inventors: Steven E. Faetanini, Sandusky, OH (US); Christopher W. Snavely, Republic, OH (US); Robert M. Brown, Elyria, OH (US); Steven J. Couvillon, Lebanon, OH (US); Sydney E. Weikert, Tipp City, OH (US)

(73) Assignee: Delphi Technologies, Inc., Troy, MI (US)

( * ) Notice: Subject to any disclaimer, the term of this patent is extended or adjusted under 35 U.S.C. 154(b) by 25 days.

(21) Appl. No.: 10/134,292

(22) Filed: Apr. 29, 2002

(65) Prior Publication Data

US 2003/0201766 A1 Oct. 30, 2003

(51) Int. Cl.[7] .............................. G01P 3/48; F16C 33/80; F16J 15/32
(52) U.S. Cl. .................. 324/174; 324/207.22; 277/371; 277/375; 384/448
(58) Field of Search ................................. 324/173, 174, 324/207.15, 207.2, 207.21, 207.22, 207.25, 262; 277/371, 375, 572; 389/448; 188/181 R

(56) References Cited

U.S. PATENT DOCUMENTS

| | | | | |
|---|---|---|---|---|
| 3,799,634 A | * | 3/1974 | Sernetz et al. ............... | 384/480 |
| 5,296,805 A | * | 3/1994 | Clark et al. .................. | 324/174 |
| 5,394,081 A | * | 2/1995 | Ogawa et al. ............... | 324/174 |
| 5,431,413 A | | 7/1995 | Hajzler ....................... | 277/317 |
| 5,470,157 A | * | 11/1995 | Dougherty et al. ......... | 384/448 |
| 5,491,407 A | * | 2/1996 | Maxson et al. ............. | 324/174 |
| 5,611,548 A | * | 3/1997 | Dahlhaus .................... | 277/574 |
| 5,762,425 A | * | 6/1998 | Ouchi ......................... | 384/448 |
| 5,969,518 A | * | 10/1999 | Merklein et al. ............ | 324/173 |
| 6,232,739 B1 | | 5/2001 | Krefta et al. ................ | 318/652 |
| 6,232,770 B1 | | 5/2001 | Schroeder ................ | 324/207.2 |
| 6,291,989 B1 | | 9/2001 | Schroeder ................ | 324/207.2 |
| 6,411,080 B1 | | 6/2002 | Bach et al. .................. | 324/173 |
| 6,422,075 B1 | * | 7/2002 | Foster et al. .................. | 73/494 |
| 6,471,211 B1 | * | 10/2002 | Garnett et al. .............. | 277/351 |
| 6,559,633 B1 | * | 5/2003 | Nachtigal et al. ........... | 324/174 |

FOREIGN PATENT DOCUMENTS

| | | | | |
|---|---|---|---|---|
| EP | 0 607 719 A1 | | 7/1994 | |
| JP | 11023598 A | * | 1/1999 | ........... G01P/3/487 |

* cited by examiner

Primary Examiner—N. Le
Assistant Examiner—Darrell Kinder
(74) Attorney, Agent, or Firm—Michael D. Smith

(57) ABSTRACT

A wheel-speed sensor mechanism assembly, a vehicle wheel bearing including such assembly and a wheel speed sensor. The assembly includes a vehicle wheel-speed sensor mechanism (such as, but not limited to, an ABS wheel-speed sensor mechanism), a sensor-mechanism housing supporting the sensor mechanism, and an electrical plug. The electrical plug is substantially immovable attached to the sensor-mechanism housing, is electrically connected to the sensor mechanism and is adapted for electrical connection to a vehicle wire. The vehicle wheel bearing includes a target ring attached to a rotatable section of the wheel bearing and includes a sensor mechanism assembly having a sensor mechanism, a sensor-mechanism housing, and the previously-described electrical plug wherein the vehicle wire is a vehicle computer cable. The sensor mechanism senses rotation of the target ring. The sensor-mechanism housing supports the sensor mechanism and is attached to a non-rotatable section of the wheel bearing. In another embodiment, the wheel speed sensor has a target ring, a sensor mechanism, and a bearing seal subassembly together defining a unitized assembly installable as a unit in a bearing cavity of a vehicle wheel bearing.

10 Claims, 5 Drawing Sheets

VEHICLE WHEEL BEARING, WHEEL-SPEED SENSOR MECHANISM ASSEMBLY, AND WHEEL SPEED SENSOR

TECHNICAL FIELD

The present invention relates generally to vehicles, and more particularly to a vehicle wheel bearing, to a wheel-speed sensor mechanism assembly, and to a wheel speed sensor.

BACKGROUND OF THE INVENTION

Vehicles include automotive vehicles having conventional wheel bearings wherein each wheel bearing includes a non-rotatable section (such as a bearing hub), a rotatable section (such as a bearing spindle) rotatably attached to the non-rotatable section, and wheel studs (also called stud bolts). The non-rotatable section typically is attached to a vehicle suspension system component. The stud bolt is press fitted into a through hole of the spindle flange. A vehicle wheel is placed on the stud bolts and secured by wheel nuts (also called lug nuts).

Some known wheel bearings include an anti-lock-braking-system (ABS) wheel speed sensor. The ABS wheel speed sensor has a target ring attached to the rotatable section of the vehicle wheel bearing and has a sensor mechanism assembly. The sensor mechanism assembly includes a sensor mechanism which senses the rotation of the target ring, a sensor-mechanism housing which supports the sensor mechanism, an electrical plug, and a pigtail wire having one end attached and electrically connected to the sensor mechanism and having another end attached and electrically connected to the electrical plug. The electrical plug is adapted for electrical connection to a vehicle ABS computer cable. The sensor-mechanism housing is attached to the non-rotatable section of the vehicle wheel bearing. The plug is attached to (via a "W-clip") and substantially totally supported by a bracket which is attached to the suspension system component (such as to a knuckle which is attached to a strut of the suspension system) to prevent undesired movement of the electrical plug within the vehicle. The pigtail wire is secured by grommets to the bracket. The vehicle wheel bearing is shipped with the vehicle wheel speed sensor already incorporated into the rest of the wheel bearing. A temporary shipping shield protects/secures the pigtail wire and the electrical plug and is discarded when assembling the bearing (including the electrical plug) to the vehicle.

What is needed is an improved vehicle wheel bearing, an improved wheel-speed sensor mechanism assembly, and/or an improved wheel speed sensor.

SUMMARY OF THE INVENTION

A first expression of an embodiment of the invention is for a vehicle wheel bearing including a vehicle-wheel-bearing non-rotatable section, a vehicle-wheel bearing rotatable section, and a wheel speed sensor. The rotatable section is rotatably attached to the non-rotatable section. The wheel speed sensor includes a target ring and a sensor mechanism assembly. The target ring is attached to the rotatable section. The sensor mechanism assembly has a sensor mechanism, a sensor-mechanism housing, and an electrical plug. The sensor mechanism is positioned to sense rotation of the target ring. The sensor-mechanism housing supports the sensor mechanism and is attached to the non-rotatable section. The electrical plug is substantially immovably attached to the sensor-mechanism housing, is electrically connected to the sensor mechanism, and is adapted for electrical connection to a vehicle computer cable.

A second expression of an embodiment of the invention is for a wheel-speed sensor mechanism assembly including a vehicle wheel-speed sensor mechanism, a sensor-mechanism housing, and an electrical plug. The sensor-mechanism housing supports the sensor mechanism. The electrical plug is substantially immovably attached to the sensor-mechanism housing, is electrically connected to the vehicle wheel-speed sensor mechanism, and is adapted for electrical connection to a vehicle wire.

A first expression of another embodiment of the invention is for a wheel speed sensor including a target ring, a sensor mechanism, and a bearing seal subassembly. The sensor mechanism surrounds the target ring and is adapted for sensing rotation of the target ring. The bearing seal subassembly is connected to the target ring and to the sensor mechanism. The target ring, the sensor mechanism, and the bearing seal subassembly together define a unitized assembly which is installable as a unit in a bearing cavity of a vehicle wheel bearing. The vehicle wheel bearing has a non-rotatable section and a rotatable section. The target ring is connectable to the rotatable section and the sensor mechanism is connectable to the non-rotatable section. The bearing seal subassembly sealingly protects the target ring and the sensor mechanism when the unitized assembly is installed as a unit in the bearing cavity of the vehicle wheel bearing.

Several benefits and advantages are derived from one or more of the expressions of the embodiments of the invention. Having the electrical plug substantially immovably attached to the sensor-mechanism housing eliminates the need for a conventional bracket which is attached to a suspension system component and to which the electrical plug is attached, eliminates the need for a conventional "W-clip", and eliminates the need for a conventional shipping shield. Having a unitized assembly for the wheel speed sensor which includes a target ring, a sensor mechanism, and a bearing seal subassembly reduces the number of prior art installation steps, and eliminates the prior art requirement of separate seals for the bearing cavity and the wheel speed sensor.

DESCRIPTION OF THE PREFERRED EMBODIMENTS

Figure 1:
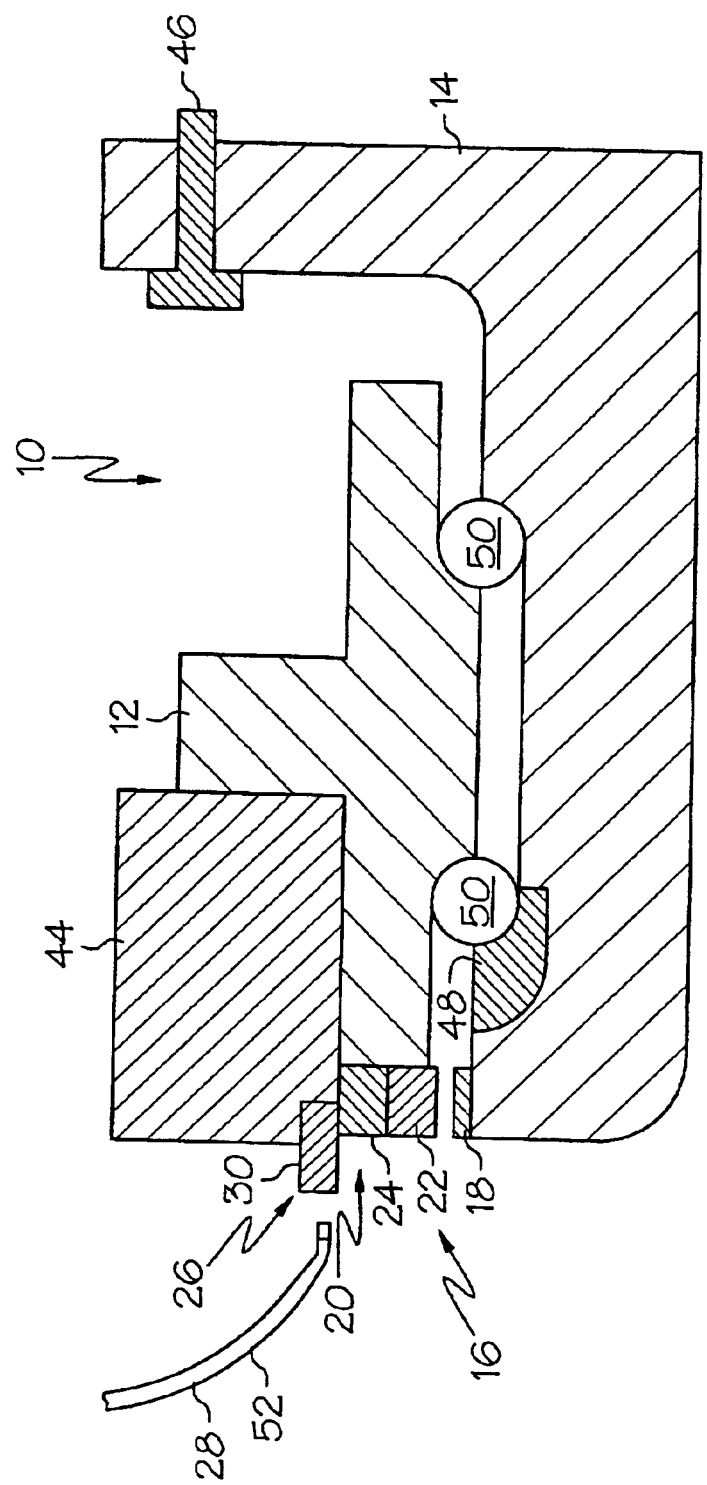
FIG. 1 is a schematic, above-axis, cross-sectional view of an embodiment of the invention showing a vehicle wheel bearing including a wheel-speed sensor mechanism assembly, and also showing a vehicle suspension system knuckle to which the non-rotatable section of the wheel bearing is attached and a portion of a vehicle computer cable about to be connected to the electrical plug of the sensor mechanism assembly.

Referring now to the drawings, FIG. 1 illustrates an embodiment of the present invention. A first expression of the embodiment shown in FIG. 1 is for a vehicle wheel bearing 10 including a vehicle-wheel-bearing non-rotatable section 12, a vehicle-wheel-bearing rotatable section 14, and a wheel speed sensor 16. The rotatable section 14 is rotatably attached to the non-rotatable section 12. The wheel speed sensor 16 includes a target ring 18 and a sensor mechanism assembly 20. The target ring 18 is attached to the rotatable section 14 of the vehicle wheel bearing 10. The sensor mechanism assembly 20 has a sensor mechanism 22, a sensor-mechanism housing 24, and an electrical plug 26. The sensor mechanism 22 is disposed to sense rotation of the target ring 18. The operation of a sensor mechanism and a target ring for a vehicle wheel speed sensor, such as an anti-lock-braking-system (ABS) wheel speed sensor, is well known. The sensor-mechanism housing 24 supports the sensor mechanism 22 and is attached to the non-rotatable section 12 of the vehicle wheel bearing 10. The electrical plug 26 is substantially immovably attached to the sensor-mechanism housing 24, is electrically connected to the sensor mechanism 22, and is adapted for electrical connection to a vehicle computer cable 28. It is understood that a vehicle computer cable is any wire coming from a vehicle module which operates as a computer. It is noted that the type of electrical plug 26 is left to the artisan and includes, without limitation, prong-type plugs and receptacle-type plugs.

In one example of the first expression of the embodiment shown in FIG. 1, the electrical plug 26 is immobilized substantially only by the sensor-mechanism housing 24. In the same or a different example, the electrical plug 26 is permanently attached to the sensor-mechanism housing 24. By "permanently attached" is meant that the electrical plug 26 cannot be detached from the sensor-mechanism housing 24 without damaging the electrical plug 26 or the sensor-mechanism housing 24 or both. In the same or a different example, the electrical plug 26 is directly attached to the sensor-mechanism housing 24. Other examples of attachments, not shown, include: the electrical plug being immobilized also by another component, the electrical plug being attached to the sensor-mechanism housing in a manner (e.g., using screws) which allow detachment without damage to the electrical plug and/or sensor-mechanism housing, and the electrical plug being indirectly attached to the sensor-mechanism housing through an intervening element, such as a gasket and/or glue.

In one enablement of the first expression of the embodiment shown in FIG. 1, the electrical plug 26 has a plug housing 30, and the plug housing 30 is directly attached to the sensor-mechanism housing 24. In one variation, the plug housing 30 is permanently attached to the sensor-mechanism housing 24. In one application of the first expression, the wheel speed sensor 16 is an antilock-braking-system (ABS) wheel speed sensor.

Figure 2:
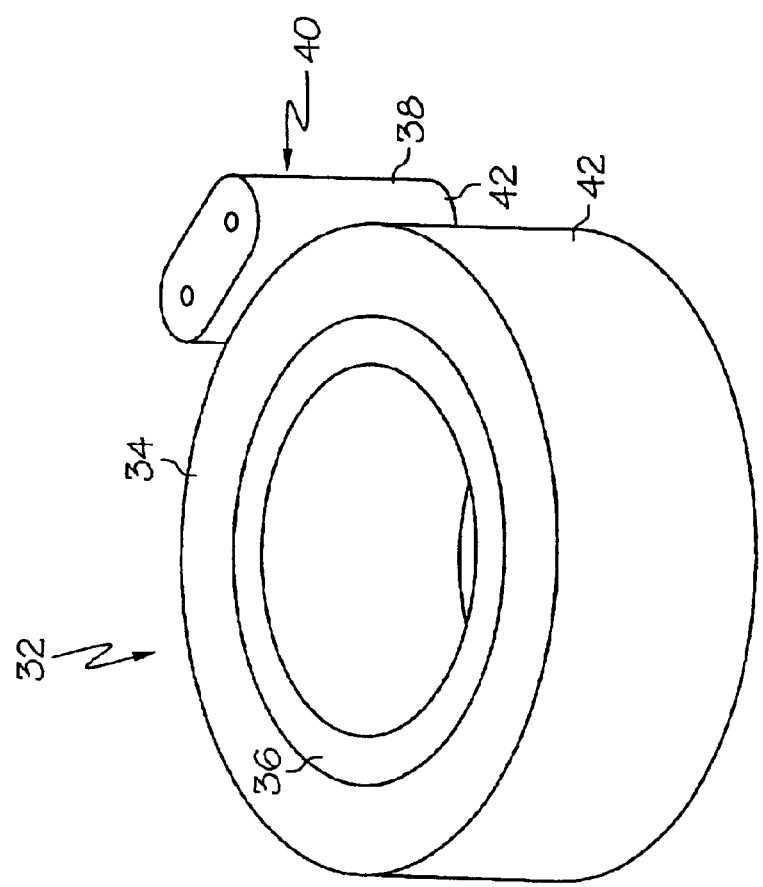
FIG. 2 is a perspective view of the wheel-speed sensor mechanism assembly of FIG. 1, but with the sensor-mechanism housing and the plug housing defining a monolithic housing structure instead of being individual components.

FIG. 2 illustrates a wheel-speed sensor mechanism assembly 32 which is identical to the wheel-speed sensor mechanism assembly 20 portion of FIG. 1, but with the sensor-mechanism housing 34 (which supports the sensor mechanism 36) and the plug housing 38 of the electrical plug 40 defining a monolithic structure 42. This is in contrast to the wheel-speed sensor mechanism assembly 20 shown in FIG. 1 wherein the sensor-mechanism housing 24 and the plug housing 30 are individual components. In one choice of materials, such monolithic structure 42 of FIG. 2 and such individual components (i.e., the sensor-mechanism housing 24 and the plug housing 30 of FIG. 1) consist essentially of plastic.

In one implementation of the first expression of the embodiment shown in FIG. 1, the non-rotatable section 12 of the vehicle wheel bearing 10 is attached to a vehicle suspension system knuckle 44. In one method, not shown, the non-rotatable section is bolted to the knuckle 44 (using the same bolt holes used for attaching the knuckle to a strut). In another method, the non-rotatable section 12 is press fitted to the knuckle 44. The knuckle 44 has a cutout allowing room for the electrical plug 26. In one example, such cutout was formally needed for a conventional shipping shield which is no longer required. In this implementation, wheel studs 46 (only one of which is shown in FIG. 1) are attached to the rotatable section 14 of the vehicle wheel bearing 10. A wheel (not shown) is attached to the wheel studs 46 by using lug nuts (not shown). In one example, the non-rotatable section 12 is a hub, and the rotatable section 14 is a spindle and includes an inboard inner race 48, wherein the other races are monolithic portions of the non-rotatable and rotatable sections which provide inboard and outboard raceways for the rolling elements 50. The type (ball, cylinder, etc.) of rolling elements 50 (or their replacement with a magnetic or air bearing, etc.) is left to the artisan. Other implementations and bearing-section examples are left to the artisan. Typically, the vehicle wheel bearing includes inboard and outboard seals (omitted from FIG. 1 for clarity) protecting the bearing cavity. In one design, not shown, the sensor mechanism assembly includes the non-rotatable portion of the inboard seal, and the target ring includes the rotatable portion of the inboard seal. Other seal designs are left to the artisan. In one construction, the electrical plug 26 is internally electrically connected to the sensor mechanism 22 meaning that the wire connection is not exposed from outside the assembled sensor mechanism assembly 20. In another construction, at least a portion of the wire connection is external meaning such connecting wire or wire portion is exposed from outside the assembled sensor mechanism assembly.

In one method of vehicle assembly, the vehicle wheel bearing 10 is brought as an assembled unit to have its non-rotatable section 12 attached to the vehicle suspension system knuckle 44. Then, the vehicle computer cable 28 is electrically connected to the electrical plug 26. Finally, a vehicle wheel (not shown) is attached to the wheel studs 46. Other methods of different vehicle assembly are left to the artisan.

A second expression of the embodiment shown in FIG. 1 is for a wheel-speed sensor mechanism assembly 20. The sensor mechanism assembly 20 has a vehicle wheel-speed sensor mechanism 22, a sensor-mechanism housing 24, and an electrical plug 26. The operation of a sensor mechanism for a vehicle wheel speed sensor, such as an anti-lock-braking-system (ABS) wheel speed sensor, is well known. The sensor-mechanism housing 24 supports the sensor mechanism 22. The electrical plug 26 is substantially immovably attached to the sensor-mechanism housing 24, is electrically connected to the vehicle wheel-speed sensor mechanism 22, and is adapted for electrical connection to a vehicle wire 52.

The wheel-speed sensor mechanism assembly 20 is not limited to attachment to a non-rotatable section of a vehicle wheel bearing. In one example, not shown, the wheel-speed sensor mechanism assembly is attached to a non-bearing vehicle member. The vehicle wheel-speed sensor mechanism 22 directly or indirectly senses wheel rotation but is not limited to sensing rotation of a target ring or a target ring attached to a rotatable section of the vehicle wheel bearing, as can be appreciated by the artisan. The vehicle wire 52, to which the electrical plug 26 is adapted for electrical connection, is not limited to a vehicle computer cable. In one example, the vehicle wire 52 is a speedometer wire. Other examples are left to the artisan.

In one example of the second expression of the embodiment shown in FIG. 1, the electrical plug 26 is immobilized substantially only by the sensor-mechanism housing 24. In the same or a different example, the electrical plug 26 is permanently attached to the sensor-mechanism housing 24. In the same or a different example, the electrical plug 26 is directly attached to the sensor-mechanism housing 24.

In one enablement of the second expression of the embodiment shown in FIG. 1, the electrical plug 26 has a plug housing 30, and the plug housing 30 is directly attached to the sensor-mechanism housing 24. In one variation, the plug housing 30 is permanently attached to the sensor-mechanism housing 24. In one application of the second expression, the vehicle wheel-speed sensor mechanism 22 is an anti-lock-braking-system (ABS) wheel-speed sensor mechanism.

FIG. 2 illustrates a wheel-speed sensor mechanism assembly 32 which is identical to the wheel-speed sensor mechanism assembly 20 portion of FIG. 1, but with the sensor-mechanism housing 34 (which supports the vehicle wheel-speed sensor mechanism 36) and the plug housing 38 of the electrical plug 40 defining a monolithic structure 42. This is in contrast to the wheel-speed sensor mechanism assembly 20 shown in FIG. 1 wherein the sensor-mechanism housing 24 and the plug housing 30 are individual components. In one choice of materials, such monolithic structure 42 of FIG. 2 and such individual components (i.e., the sensor-mechanism housing 24 and the plug housing 30) of FIG. 1 consist essentially of plastic.

Figure 3:
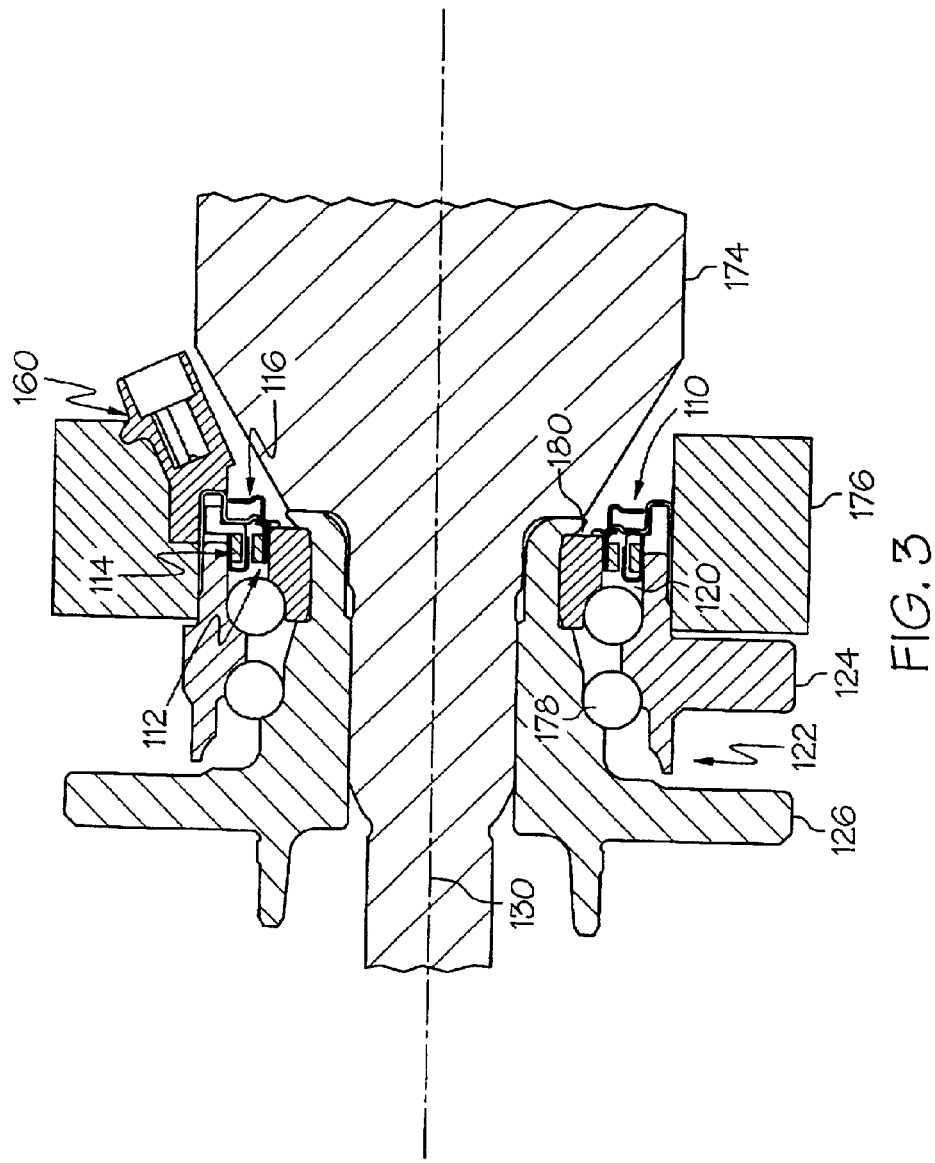
FIG. 3 is a cross-sectional view of another embodiment of the invention, showing a vehicle wheel bearing and an installed wheel speed sensor.
Figure 4:
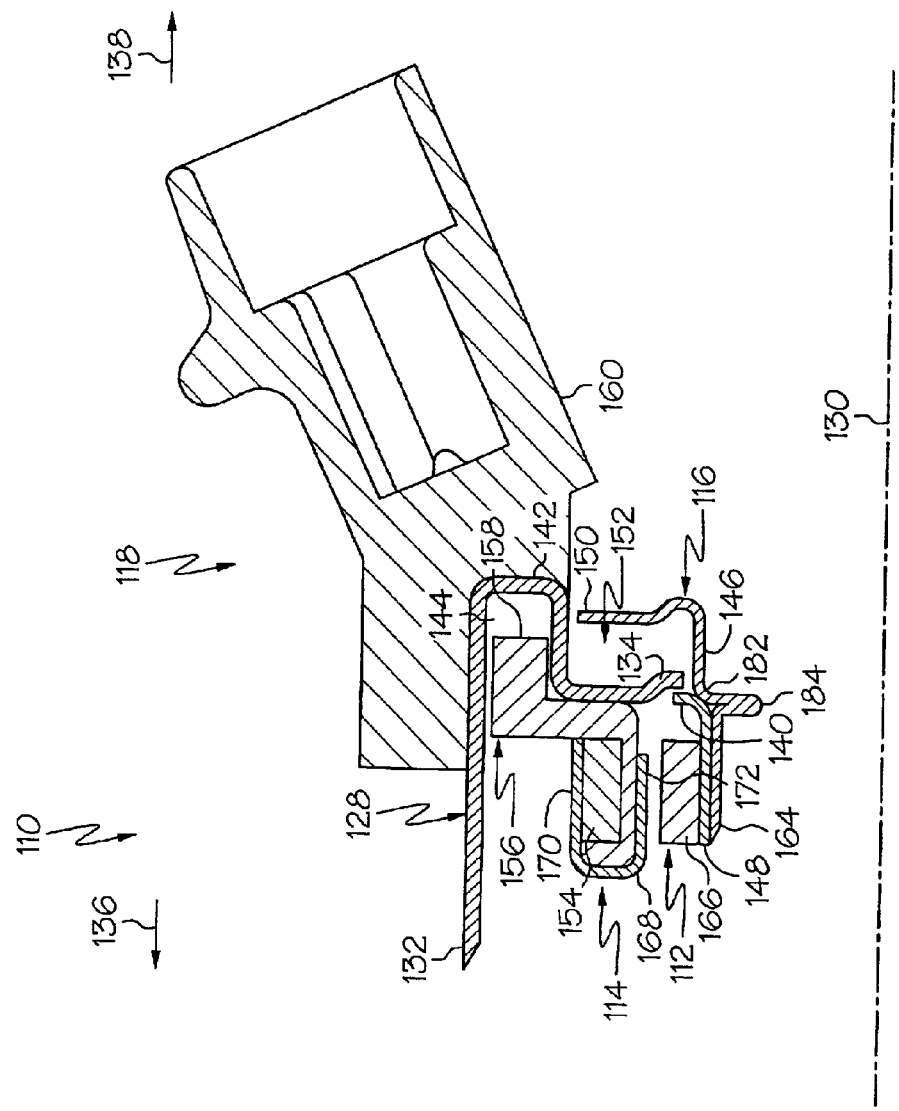
FIG. 4 is an above-axis view of the wheel speed sensor of FIG. 3 before installation of the wheel speed sensor in the vehicle wheel bearing of FIG. 3.
Figure 5:
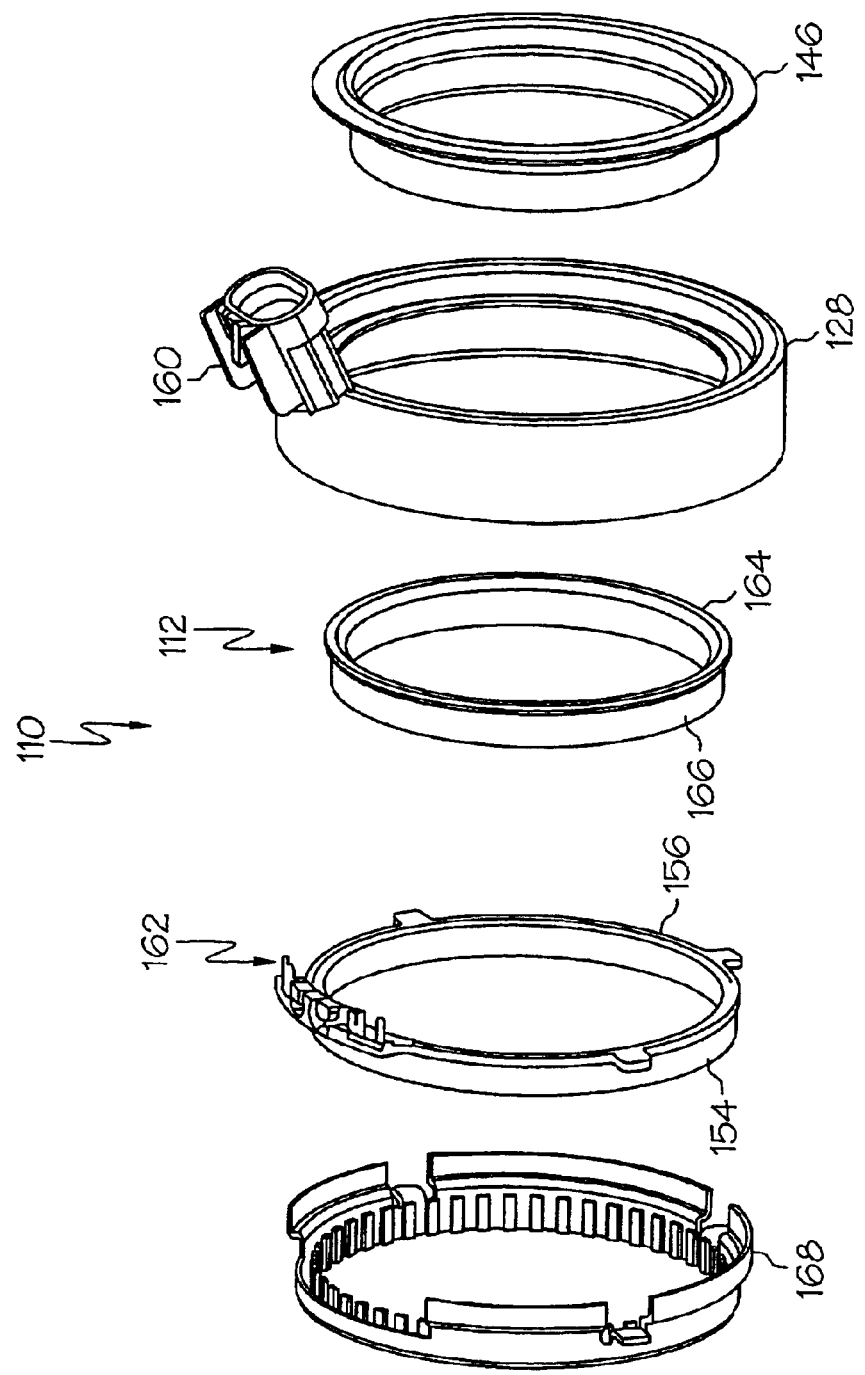
FIG. 5 is a perspective, exploded view of the wheel speed sensor of FIG. 4.

Referring again to the drawings, FIGS. 3–5 illustrate another embodiment of the present invention. A first expression of the embodiment shown in FIGS. 3–5 is for a wheel speed sensor 110 including a target ring 112, a sensor mechanism 114, and a bearing seal subassembly 116. The sensor mechanism 114 surrounds the target ring 112 and is adapted for sensing rotation of the target ring 112. The bearing seal subassembly 116 is connected to the target ring 112 and to the sensor mechanism 114. The target ring 112, the sensor mechanism 114, and the bearing seal subassembly 116 together define a unitized assembly 118 which is installable as a unit in a bearing cavity 120 of a vehicle wheel bearing 122. The vehicle wheel bearing 122 has a non-rotatable section 124 and a rotatable section 126. The target ring 112 is connectable to the rotatable section 126, and the sensor mechanism 114 is connectable to the non-rotatable section 124. The bearing seal subassembly 116 sealingly protects the target ring 112 and the sensor mechanism 114 when the unitized assembly 118 is installed as a unit in the bearing cavity 120 of the vehicle wheel bearing 122.

The particular type of target ring 112 and the particular type of sensor mechanism 114 are left to the artisan. For example, and without limitation, in one application the target ring includes a magnetic encoder and the sensor mechanism includes a passive sensor element such as a sensor coil. In another non-limiting example, the sensor mechanism includes an active sensor element such as a Hall-effect sensor. In a further non-limiting example, the sensor mechanism includes an optical sensor. The particular type of vehicle wheel bearing 122 is left to the artisan. For example, and without limitation, in one application the rotatable section of the vehicle wheel bearing is a spindle attached to a drive (or non-drive) shaft, and the non-rotatable section of the vehicle wheel bearing is a hub attached to a suspension system knuckle member. In another non-limiting example, a spindle is the non-rotating member and a hub is the rotating member.

In one example of the first expression of the embodiment of FIGS. 3–5, the bearing seal subassembly 116 includes an annular seal can 128 having a longitudinal axis 130, having a longitudinally inbound first end 132 engageable with the non-rotatable section 124 of the vehicle wheel bearing 122, and having a radially inward second end 134. The first end 132, when the unitized assembly 118 is installed in the bearing cavity 120, is disposed more longitudinally inbound into the bearing cavity 120 than is the second end 134. The longitudinally inbound direction 136 and the longitudinally outbound direction 138 are shown in FIG. 4. The second end 134 is disposed more radially inward toward the longitudinal axis 130 than is the first end 132. The target ring 112 is disposed radially inward of the first end 132 of the seal can 128 and has a target flange 140 which is disposed longitudinally inbound of and radially overlaps the second end 134 of the seal can 128. The target flange 140 and the second end 134 each define a labyrinth seal tooth.

In one variation, the seal can 128 includes a segment 142 disposed between the first and second ends 132 and 134 and having a longitudinally inbound facing circular groove 144. In this variation, the bearing seal subassembly 116 includes an annular slinger 146 coaxially aligned with the seal can 128, having a longitudinally inbound first end portion 148 attached to and disposed radially inward of the target ring 112. The slinger 146 also has a second end portion 150 which is disposed longitudinally outbound of, and extends radially outward of, the second end 134 of the seal can 128 to define a seal cavity 152 between the slinger 146 and the seal can 128. In one enablement, the seal cavity 152 contains flexible (such as elastomeric) seal lips which have been omitted from the figures for clarity. The first end portion 148, when the unitized assembly 118 is installed in the bearing cavity 120, is disposed more longitudinally inbound into the bearing cavity 120 than is the second end portion 150. The second end portion 150 extends radially outward until proximate the segment 142 of the seal can 128 to define a labyrinth seal tooth. In one implementation, the first end portion 148 is engageable with the rotatable section 126 of the vehicle wheel bearing 122.

In one modification, the sensor mechanism 114 includes a sensor element 154 and an annular carrier (also sometimes called a bobbin) 156 coaxially aligned with the longitudinal axis 130 and contacting the sensor element 154. The annular carrier 156 longitudinally contacts the seal can 128 between the segment 142 and the second end 134 of the seal can 128. The annular carrier 156 has a longitudinally inbound rim 158 engaging the circular groove 144 of the seal can 128.

In one design, the wheel speed sensor 110 also includes an electrical plug 160 substantially immovably attached to the seal can 128, electrically connected to the sensor element 154 (such as through terminals 162 seen in FIG. 5), and adapted for electrical connection to a vehicle wire 52 (seen in the first embodiment of FIG. 1). In another design, not shown, the electrical plug is movably attached to the seal can through a pigtail wire electrically connected to the sensor element.

In one construction, the target ring 112 includes a retainer ring portion 164 and a target element 166 attached to the retainer ring portion 164. It is noted that the target flange 140 of the target ring 112 is a flange of the retainer ring portion 164. An example, without limitation, of a target element is a magnetic encoder. Other examples of target elements are left to the artisan.

In one implementation, the sensor mechanism 114 also includes an annular stator 168 having longitudinally outbound first and second flanges 170 and 172 securing the sensor element 154 to the carrier 156. One of the first and second flanges 170 and 172 is engageable with the non-rotatable section 124 of the vehicle wheel bearing 122.

In one application, for a driven vehicle wheel, the rotatable section 126 of the vehicle wheel bearing 122 is attached to a vehicle drive shaft 174. The non-rotatable section 124 of the vehicle wheel bearing 122 is attached to a suspension-system knuckle member 176. In the application shown in FIG. 3, the vehicle wheel bearing 122 includes balls 178 as rolling elements, and the rotatable section 126 includes an inner ring 180.

In the example of the second embodiment shown in FIGS. 3–5, the target element 166 (such as a magnetic encoder) is molded onto the retainer ring portion 164 of the target ring 112. The seal lips (not shown) are molded of flexible material onto the seal can 128. The housing of the electrical plug 160 is molded of plastic material to the seal can 128 to form a sealed connector body. The seal lips (not shown) are greased and the slinger 146 is assembled into the seal can 128 to a position which controls the sealing function. The target element 166, when a magnetic-encoder type of target element is used, is molded of flexible material (with embedded magnetic particles) onto the retainer ring portion 164 of the target ring 112. The magnetic encoder is magnetized with multiple pole pairs. The target ring 112 is then pressed onto the outside diameter of the press-in diameter of the slinger 146. The target flange 140 of the retainer ring portion 164 allows for a positive stop against the inside flange 182 of the slinger 146. The target flange 140 on the retainer ring portion 164 of the target ring 112 keeps the slinger 146 and the seal can 128 from disassembling themselves. The target flange 140 also provides magnetic coupling for a passive sensor-element circuit. The sensor element 154 is placed with the carrier 156 (such as a sensor coil being wound onto a bobbin/carrier or an active sensor element being inserted into the carrier). This is then inserted into the stator 168. The number of teeth on the stator 168 match the number of pole pairs on the magnetic encoder. The sensor mechanism 114 is pressed into the seal can 128. The sensor mechanism 114 is retained in the seal can 128 by the rim 158 of the carrier 156 engaging the circular groove 144 of the seal can 128. The carrier 156 contains terminals which mate with terminals in the electrical plug 160. Thus, the components of the wheel speed sensor 110 are assembled into a unitized assembly 118.

The wheel speed sensor 110, as a unitized assembly 118, is pressed onto both the non-rotatable and rotatable sections 124 and 126 of the vehicle wheel bearing 122, as shown in FIG. 3, in one process step. The first end portion 148 of the slinger 146 is pressed onto the inner ring 180 until the slinger flange 184 bottoms on the top surface of the inner ring 180 of the rotatable section 126 of the vehicle wheel bearing 122. Simultaneously, the first end 132 of the seal can 128 is pressed onto the outside diameter of hub-pilot portion of the non-rotatable section 124 of the vehicle wheel bearing 122. A press tool maintains the location between the slinger 146 and the seal can 128. In this one step the wheel speed sensor 110, as a unitized assembly 118, is assembled to the vehicle wheel bearing 122. The slinger 146 with the target ring 112 rotates when the rotatable section 126 (including the inner ring 180) of the vehicle wheel bearing 122 is driven by the vehicle drive shaft 174 (or is rotated by a vehicle non-drive shaft). The fixed seal can 128 with the seal cavity 132 protects the bearing 122 from contaminants. The sensor element 154 along with the teeth of the stator 168 converts the changing magnetic field into an electrical signal. It should be noted that the an active sensor element (such as a Hall Effect, magnetoresistive, optical, or other device) or a passive sensor element can be used, and that a target element other than a magnetic encoder can be used. This provides for other or future sensing technology to be implemented without having to redesign the wheel speed sensor 110.

In one choice of materials, the seal can 128 consists essentially of steel, and the slinger 146 consists essentially of stainless steel. In one implementation, the retainer ring portion 164 and the stator 168 each consist essentially of steel. In one application, the carrier 156 and the housing of the electrical plug 160 each consist essentially of plastic.

The wheel speed sensor 110 provides protection for the sensor element 154 and the target element 166 by enclosing them into the sealed bearing cavity 120. Thus, the wheel speed sensor 110 does not have to be over-molded to protect it from the outside environment. This eliminates manufacturing steps and potential quality problems. It also reduces cost by eliminating the over-mold material and the corrosion protection otherwise needed. It is noted that the sealing function has been improved by the addition of the labyrinth tooth created by the target flange 140 of the target ring 112 and by the labyrinth tooth created by the second end 134 of the seal can 128. The long press lengths of the slinger 146 and the seal can 128 lengthen potential leak paths. In addition, the slinger flange 184 of the slinger 146 increases the potential leak path between the slinger 146 and the inner ring 180. The assembly of the wheel speed sensor 110 to the vehicle wheel bearing 122 is reduced to one press operation instead of the typical three operations required in the prior art.

Several benefits and advantages are derived from one or more of the expressions of the embodiments of the invention. Having the electrical plug substantially immovably attached to the sensor-mechanism housing eliminates the need for a conventional bracket which is attached to a suspension system component and to which the electrical plug is attached, eliminates the need for a conventional "W-clip", and eliminates the need for a conventional shipping shield. Having a unitized assembly for the wheel speed sensor which includes a target ring, a sensor mechanism, and a bearing seal subassembly reduces the number of prior art installation steps, and eliminates the prior art requirement of separate seals for the bearing cavity and the wheel speed sensor.

The foregoing description of several expressions of embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A wheel speed sensor comprising:
   a) a target ring;
   b) a sensor mechanism surrounding the target ring and adapted for sensing rotation of the target ring; and
   c) a bearing seal subassembly having a first seal portion fixedly connected to the target ring and having a second seal portion fixedly connected to the sensor mechanism, wherein the target ring, the sensor mechanism, and the bearing seal subassembly together define a unitized assembly which is installable as a unit in a bearing cavity of a vehicle wheel bearing having a non-rotatable section and a rotatable section with the target ring connectable to the rotatable section and with the sensor mechanism connectable to the non-rotatable section, wherein the first and second seal portions each have a radially extending section disposed completely longitudinally outward of both the target ring and the sensor mechanism when the unitized assembly is installed as a unit in the bearing cavity of the vehicle wheel bearing, and wherein the bearing seal subassembly sealingly protects the target ring and the sensor mechanism when the unitized assembly is installed as a unit in the bearing cavity of the vehicle wheel bearing.

2. A wheel speed sensor comprising:

a) a target ring;

b) a sensor mechanism surrounding the target ring and adapted for sensing rotation of the target ring; and c) a bearing seal subassembly connected to the target ring and to the sensor mechanism, wherein the target ring, the sensor mechanism, and the bearing seal subassembly together define a unitized assembly which is installable as a unit in a bearing cavity of a vehicle wheel bearing having a non-rotatable section and a rotatable section with the target ring connectable to the rotatable section and with the sensor mechanism connectable to the non-rotatable section, wherein the bearing seal subassembly sealingly protects the target ring and the sensor mechanism when the unitized assembly is installed as a unit in the bearing cavity of the vehicle wheel bearing, wherein the bearing seal subassembly includes an annular seal can having a longitudinal axis, having a longitudinally inbound first end engageable with the non-rotatable section of the vehicle wheel bearing, and having a radially inward second end, wherein the target ring is disposed radially inward of the first end of the seal can and has a target flange which is disposed longitudinally inbound of and radially overlaps the second end of the seal can, and wherein the target flange and the second end each define a labyrinth seal tooth.

3. The wheel speed sensor of claim 2, also including an electrical plug substantially immovably attached to the seal can, electrically connected to the sensor mechanism, and adapted for electrical connection to a vehicle wire.

4. The wheel speed sensor of claim 2, wherein the seal can includes a segment disposed between the first and second ends and having a longitudinally inbound facing circular groove, and wherein the bearing seal subassembly includes an annular slinger coaxially aligned with the seal can, having a longitudinally inbound first end portion attached to and disposed radially inward of the target ring, and having a second end portion which is disposed longitudinally outbound of, and extends radially outward of, the second end of the seal can to define a seal cavity between the slinger and the seal can, and which extends radially outward until proximate the segment of the seal can to define a labyrinth seal tooth.

5. The wheel speed sensor of claim 4, wherein the first end portion of the slinger is engageable with the rotatable section of the vehicle wheel bearing.

6. The wheel speed sensor of claim 5, wherein the sensor mechanism includes a sensor element and an annular carrier coaxially aligned with the longitudinal axis and contacting the sensor element, wherein the annular carrier longitudinally contacts the seal can between the segment and the second end of the seal can and has a longitudinally inbound rim engaging the circular groove of the seal can.

7. The wheel speed sensor of claim 6, also including an electrical plug substantially immovably attached to the seal can, electrically connected to the sensor element, and adapted for electrical connection to a vehicle wire.

8. The wheel speed sensor of claim 6, wherein the target ring includes a retainer ring portion and a target element attached to the retainer ring portion, and wherein the target flange of the target ring is a flange of the retainer ring portion.

9. The wheel speed sensor of claim 8, wherein the sensor mechanism also includes an annular stator having longitudinally outbound first and second flanges securing the sensor element to the carrier, and wherein one of the first and second flanges is engageable with the non-rotatable section of the vehicle wheel bearing.

10. The wheel speed sensor of claim 9, also including an electrical plug substantially immovably attached to the seal can, electrically connected to the sensor element, and adapted for electrical connection to a vehicle wire.

* * * * *